(No Model.) 3 Sheets—Sheet 1.
W. B. POTTER.
CLOSED CONDUIT ELECTRIC RAILWAY SYSTEM.
No. 589,786. Patented Sept. 7, 1897.
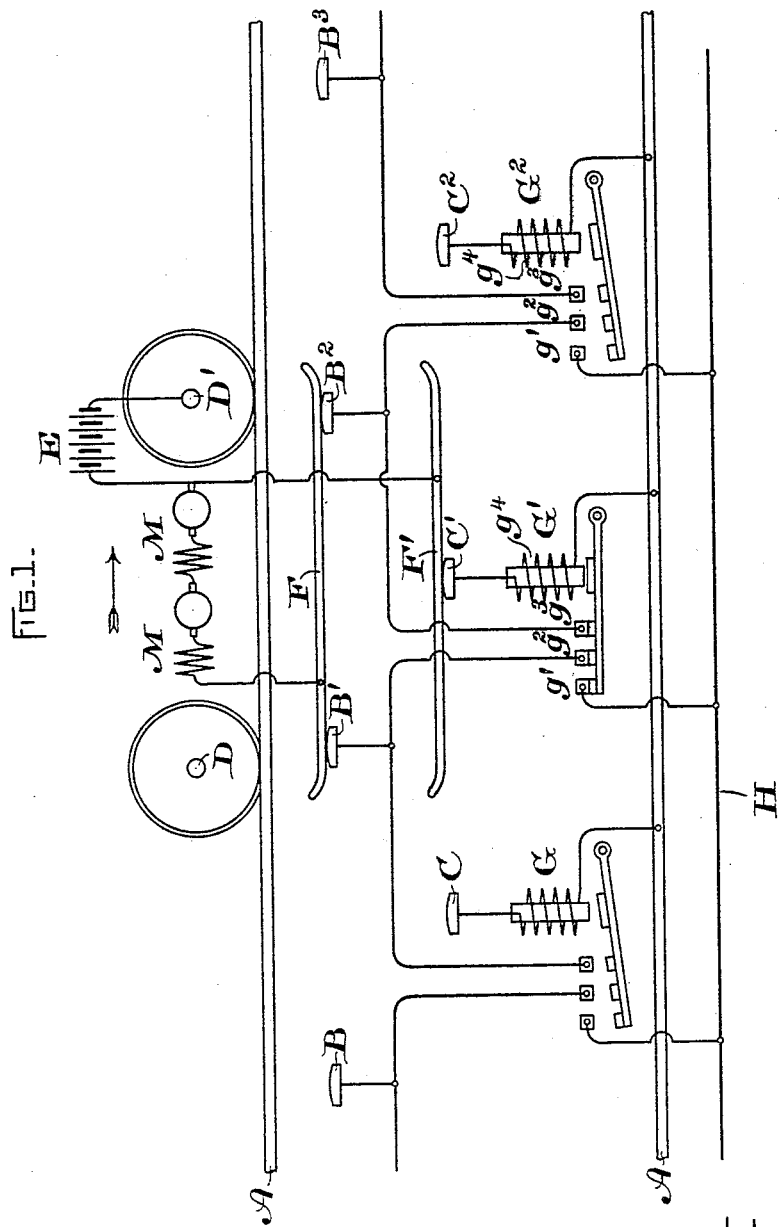
WITNESSES.
A. H. Abell.
A. F. Macdonald.
INVENTOR.
William B. Potter, by
Geo. R. Blodgett,
Atty.

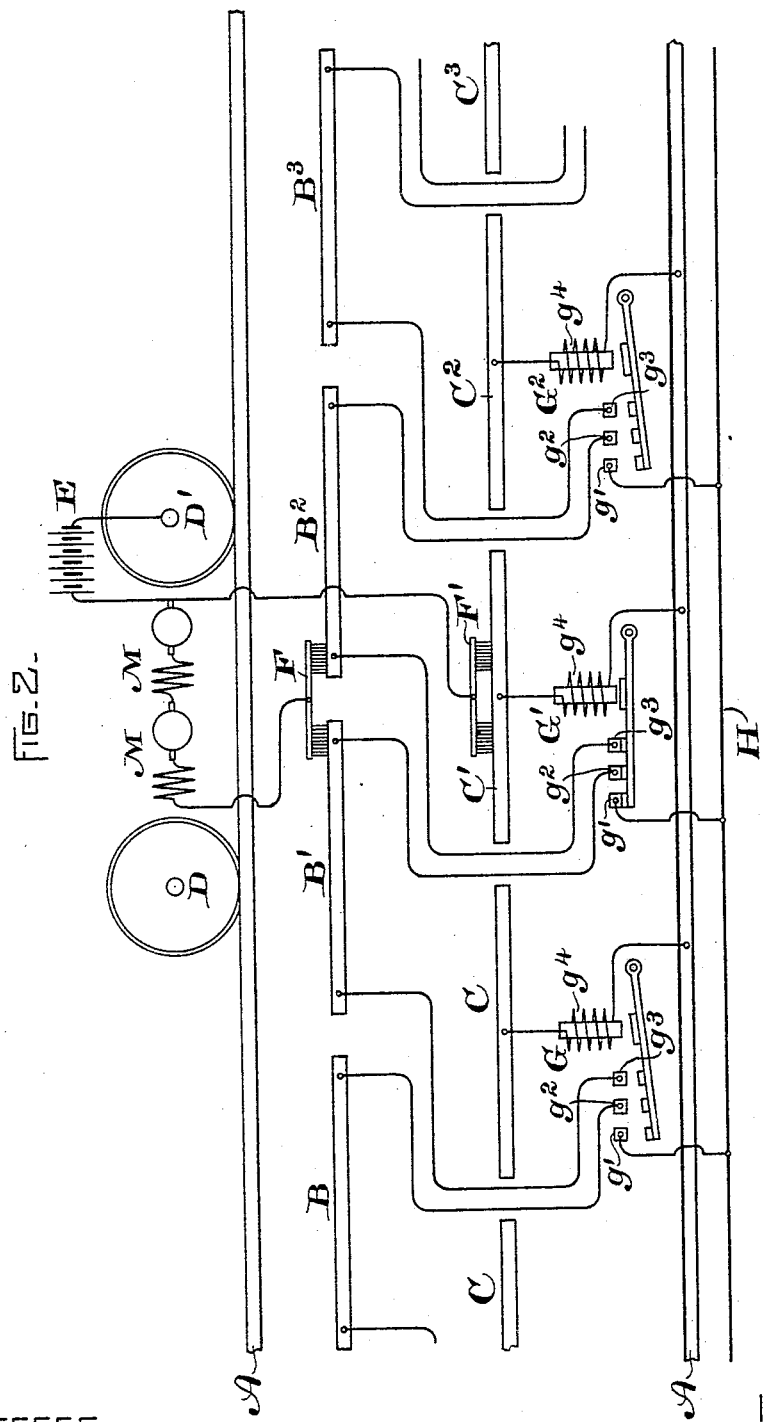

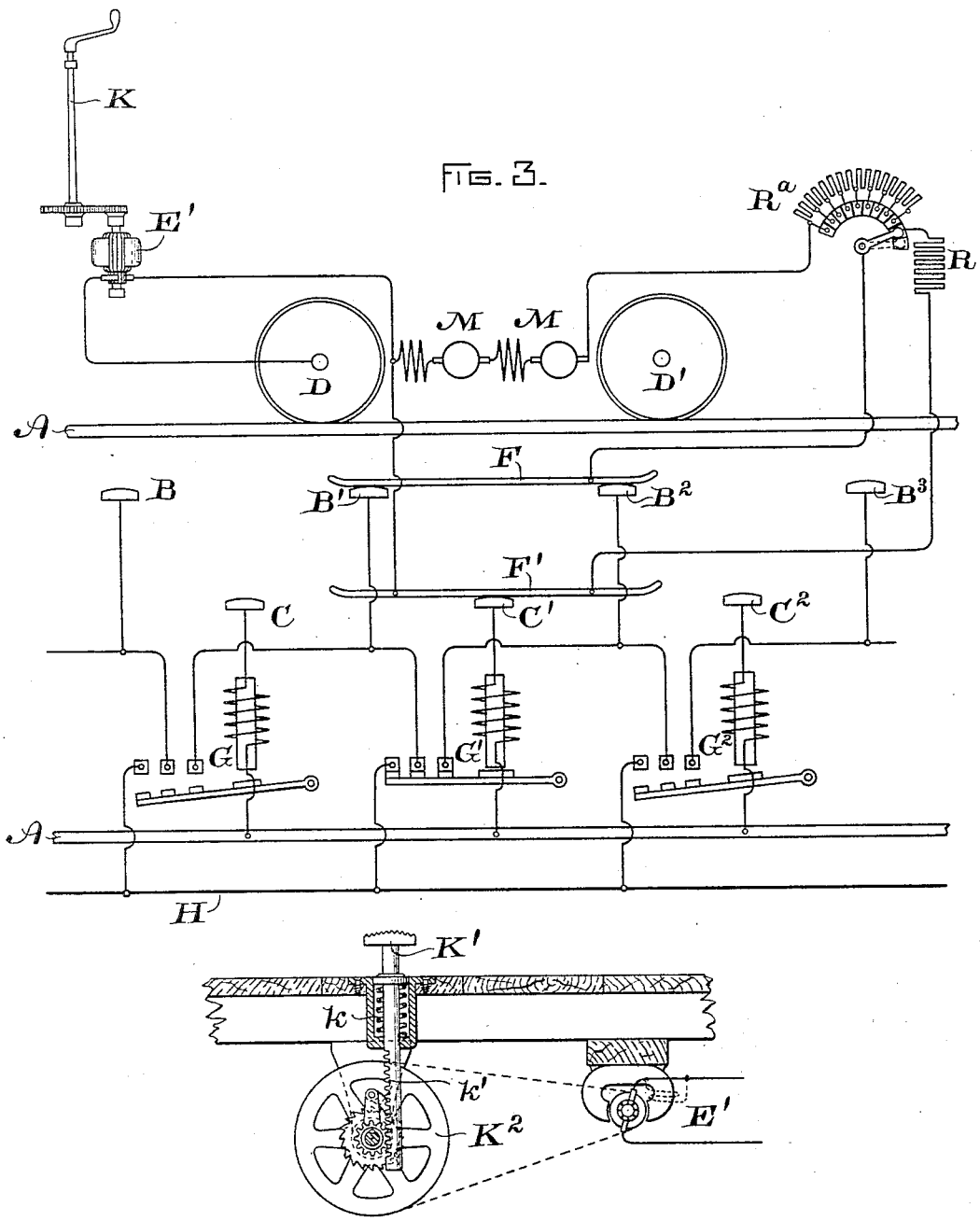

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

CLOSED-CONDUIT ELECTRIC-RAILWAY SYSTEM.

SPECIFICATION forming part of Letters Patent No. 589,786, dated September 7, 1897.

Application filed October 6, 1896. Serial No. 607,998. (No model.)

*To all whom it may concern:*

Be it known that I, WILLIAM B. POTTER, a citizen of the United States, residing at Schenectady, in the county of Schenectady, State of New York, have invented certain new and useful Improvements in Surface - Contact Electric Railways, (Case No. 441,) of which the following is a specification.

My invention relates to electric railways operated by the well-known closed-conduit or surface-contact system, and has for its object to provide a system in which there will be a comparatively small number of operating parts, with a simple and efficient arrangement of circuits, insuring the connection of the sectional working conductors with the feeder during the passage of the car and permitting the switches to drop as soon as the car has passed.

Other objects of the invention will appear from the description, and the novelty will be pointed out in the claims.

To attain the objects of my invention I employ a system of supply with one or more feeders, preferably buried, (although they may be located in any way conveniently adjacent to the road,) with the usual contact-studs or sectional rails forming the working conductors. The latter I divide into two sets of contacts, one series of high-potential studs or contacts, through which the working current flows to the positive terminal of the motor or motors for the propulsion of the car, the other of low-potential studs on the negative side of the motor, with which are connected suitable devices for picking up the electromagnetic switches. The terms "high" and "low" potential I employ in this connection to distinguish conveniently between those studs connected to the feeder and those connected to the return. Two collecting devices in the form of sliding shoes are provided, spanning the gap between the sectional conductors, so that one is always in circuit before the previous one is cut out. The studs or sectional conductors are arranged in two rows and "staggered," as it is termed—that is, they alternate in position in the two series—and, as I prefer to place them, are in the roadway between the rails. Carried by the car is a small storage battery of low potential, serving to "pick up" when current is not flowing through the motors. At other times it may, if desired, be cut out, or the arrangement may be such that the motor-current acts to charge the battery. Inasmuch as it is required to do but little work, and that through comparatively low resistance, (it being connected between the track forming the ground on one side and through the low-potential studs and pick-up coils of the switches to ground upon the other side,) it need be but of comparatively small capacity and low electromotive force, twenty or twenty-five volts being sufficient to overcome with certainty the resistance in its circuit. The battery is connected in series with the motor, but in multiple with the pick-up coils of the various switches, the utility of this particular arrangement being pointed out hereinafter.

The switch which I have devised for connecting the buried feeder with the working conductors comprises a pick-up magnet having a coil connected to ground at one end, the other being connected to one of the low-potential studs, the coil being upon the negative or ground side of the system. The usual switch-contacts are provided, in this case there being three of them. One of these is connected to the feeder, and from each of the others connection is made to one of the studs in the roadway, so that the closing of each of the switches energizes two of the high-potential studs. These latter connections are direct, including no holding-up coil or other device tending to reduce potential, so that the full working potential is conveyed to each of the contact-studs in the roadway.

The accompanying drawings show my invention in some of its different aspects, Figure 1 showing, in diagram, the preferred arrangement of circuits; Fig. 2, the sectional conductors in the form of rails with a collecting-brush spanning the gap between each two of them. Fig. 3 shows how I may replace the storage battery with another source of electromotive force, and Fig. 4 is a detail of a modified arrangement of the device shown in Fig. 3.

In Fig. 1, A A are the track-rails, serving, as usual, for the ground-return, although this is not essential. B B' are the high-potential studs, C C' the low-potential studs, and G G' the switches. Each of these latter is provided with a coil $g^4$, serving to pick up the switch and complete the circuit between the feeder and the road-contacts, the coil being in circuit between the studs C C' and ground. Three contacts $g'$ to $g^3$ are provided for each switch. The contact $g'$ is connected to the feeder H. Contacts $g^2$ $g^3$ are connected, respectively, to the adjacent high-potential studs on each side of each switch, those, for instance, on the switch G' being connected to the studs B' B².

E is the storage battery or other source of electromotive force, connected between the axle D' of the car and the sliding contact or shoe F'.

M M are the motors, of which there may be one or more without varying from my invention.

The sliding contact or shoe F' completes the circuit for the negative side of the motors, while the shoe F is connected to the positive side.

The operation of the devices just described is as follows: The switch G' is shown closed, current therefore passing from the feeder H to the contact $g'$ and by the switch-blade to contacts $g^2$ $g^3$. From the first of these current passes to the stud B' in the roadway, from the second to the stud B². These two studs being both in engagement with the shoe F, the circuit is completed by the shoe to the motors, and thence to the shoe F', then through the coil $g^4$ of the switch to ground or the return-circuit. The main-line current thus passing through the coil holds up the switch after it is brought to its attracted position.

As thus described it will be seen that so long as one of the switches G is closed the storage battery or other auxiliary source of electromotive force has no necessary function. Assume, however, that all of the switches are down, as when the car comes to a stop, and the motor-current is interrupted. In this case, there being no connection from any of the studs to ground through the motors, no current would flow in the pick-up circuits. The storage battery E then acts to pick up, it being grounded at one end on the car-axle and through the various low-potential studs C' C² having its circuit completed through the pick-up coils to ground. The battery may, of course, be again cut out as soon as current passes through the motor, as will be manifest when the operation of the various switches by the passage of the car is considered.

Assume now that the car is moving to the right in the direction of the arrow, Fig. 1. The next change in the circuits from the arrangement illustrated will occur when the shoe F leaves the stud B'. There being still a path for the current of substantially equal resistance to the one broken, there is no objectionable sparking in the roadway, the current still continuing to pass from the contact $g^3$ to the stud B² and to the motors, as before. When the shoe F' reaches the stud C², (this being the next change in the connections,) the switch G² will pick up, the main-line current passing through the coil $g^4$ to ground. The circuits are thus established for the high-potential studs B² B³. The shoe F is in contact with the stud B² and the shoe F' with the studs C' C². When the shoe leaves the stud C', the ground connection through that stud and its corresponding switch-magnet being broken, the switch G' drops; but, as in the case of the high-potential studs, the stud C² being in circuit before the contact with C' is broken and offering an alternative path of equal resistance for the current, there is but little sparking at breaking contact. During the time that the shoe F' is in contact with both of the low-potential studs C' C² the switches G' G² are both in their attracted positions, but as soon as the shoe passes off the stud of either switch the switch-blade drops. The paths for the current with the switch G² attracted are from the contact $g^2$ to the stud B², from the contact $g^3$ to the stud B³, the motors being supplied through the stud B² and grounded through the stud C², holding the switch G² attracted. The next change in the connections is when the shoe F touches the stud B³, the condition shown in Fig. 1 again existing, except that the switch G² takes the place of G'.

It is unnecessary to trace the connections when the car moves in the other direction, as they are symmetrical with those already described.

In Fig. 2 I have shown the same arrangement as that in Fig. 1, except that the sectional contacts are shown as rails having an insulating-space between them and are normally insulated from ground. In this case, however, the shoes or collectors are simply long enough to span the gaps between the rails, so that each of the sections is cut in before the last preceding one is cut out.

In Fig. 3 I show how another generator of electromotive force might take the place of the storage battery, it being under some circumstances undesirable to use the latter. In such cases I provide a small magneto-generator E', geared to a handle K, which might be the brake-handle. The connections of this generator are the same as those of the storage battery. At R$^a$, I show diagrammatically a controlling device of any suitable form, while at R is a limiting-resistance in shunt to the motor-circuit, it being thus connected between the shoes F F'. During normal operation the motor-current holds up the switches G G' as the shoe touches the studs C C'. When the car is brought to a stop, the current flowing in the shunt-circuit (which should be connected to the contact next to the off position of the controller) would be sufficient (being limited by the resistance R) to hold up the magnet until the car starts. If, however, stops of some length are to be made or if the car be run out from the barn for the first time or under any other circumstances when it is undesirable to leave the resistance in circuit and employ the line-current, the magneto-dynamo E' may be operated to obtain the initial impulse for the switches, the controller being brought to the position in which the resistance R is cut in, the circuit from this resistance holding up the switch after it has been brought to contact. At the first movement of the controller sending current through the motors the resistance R is cut out and the motor-current operates the switch as before, sufficient overlap being provided, as is well understood, to prevent the switch dropping.

In Fig. 4 I have shown a modified form of the arrangement, in which the stud K' takes the place of the handle K, the magneto E' being belted to the fly-wheel K². The stud K' is provided with a rack k' and a spring k for returning it to position, so that when the motorman presses down the stud the fly-wheel K² is rotated, developing sufficient electromotive force in the magneto E' to pull up the first of the switches.

In the operation of a practical full-sized embodiment of my invention I have found that several essential features are obtained by the combinations of apparatus and circuits above described. Some of these are as follows: By employing a low-potential battery for the initial pick-up and also to maintain connection with the feeder I may obtain the inherent advantages of this form of battery. It being in parallel to the pick-up coils any flow of current producing a greater drop around the coil than the electromotive force of the battery diverts a portion of the current through it in opposition to its electromotive force, and thus acts to charge it. The battery being in series with the motors and not in multiple with them, as it is sometimes arranged, may work with comparatively small current and of moderate potential. After connection with the feeder has been established by the closing of any of the switches the full line-potential is available to break through or puncture dirt or other insulating material which might collect upon the contact-studs in the roadway and tend to prevent proper electrical contact between the shoes and the studs.

By the staggering of the contacts in the way which I prefer and by the disposition of the several circuits connected with the pick-up switches each contact-stud in advance of the car is connected to the feeder at a predetermined interval before the contact is made by the motor-shoe, this interval being sufficient to allow for any sluggishness of the switches, so that an unfailing supply of current is preserved for the motors. This is accomplished, not by the interconnection of the various switches with one another so that one switch being picked up acts to pick up another switch in advance and thus energize the contacts connected to that switch, but by connecting to each switch more than one of the road-contacts. Furthermore, an unfailing supply of current is insured by a feature of the connections which will be apparent from the description and drawings—that is, that each of the road-contacts furnishing current to the motor is in circuit with two of the switches, so that not only is sufficient time interval or "overlap," as it is called in the art, allowed, but should for any reason any one of the switches fail to act the car is not thereby immediately deprived of current, as at least one of the studs with which it is in contact would still be supplied from another switch. The path of the main current from the feeder to the high-potential studs is direct on the positive side, so that there is no drop in potential, and the pick-up coils could not be energized by a leakage-current. This being accomplished without interconnection of the magnet-coils on the switches, if any of the ground-wires should break it acts merely to disable the switch where the accident occurs and does not, as in some systems, pick up other switches and energize contacts not covered by the car. The switch connections being also entirely symmetrical, the system is applicable to running with equal facility in either direction. The arrangement of the contacts entirely within the roadway is an added feature of security against leakage acting to hold up any of the switches.

What I claim as new, and desire to secure by Letters Patent of the United States, is—

1. A surface-contact electric-railway system, comprising a feeder, sectional conductors, a track, and electromagnetic switches for establishing temporary connection between the feeder and the successive sectional conductors, each switch provided with a single coil in circuit on the negative side of the system, and contacts making direct connection between the feeder and the sectional conductors, each switch furnishing current to more than one sectional conductor.

2. A surface-contact electric-railway system, comprising a feeder, sectional conductors, and electromagnetic switches for establishing temporary connection between the feeder and the successive sectional conductors, each switch provided with a single coil in circuit on the negative side of the system, and contacts making direct connection between the feeder and the sectional conductors, each switch furnishing current to more than one sectional conductor, and each section taking current by permanent independent connections from more than one switch.

3. A surface-contact electric railway, comprising a feeder, sectional conductors, a source of electromotive force of low potential upon the vehicle, and electromagnetic switches for making temporary connection between the feeder and the sectional conductors, each switch provided with a coil forming a ground connection through which both the motors and the auxiliary source of electromotive force are grounded, and contacts making direct connection between the feeder and the sectional conductors, each switch energizing more than one sectional conductor and each sectional conductor taking current by permanent independent connections from a plurality of switches.

4. The combination in an electric-railway system, of a row of high-potential studs or sectional conductors insulated from each other and from the line, when electrically inactive, switches having contacts by which said studs are connected to the line-circuit in pairs or sets when the switches are closed, and a second row of low-potential studs or sectional conductors connected with the negative branch of the supply-circuit through magnet-coils upon the switches, said high and low potential studs respectively forming part of a series circuit through the car motor or motors when the system is in operation.

5. The combination in a surface-contact electric-railway system, of a row of high-potential studs or sectional conductors disconnected from each other and from the line, when electrically inactive, and automatically-acting electromagnetic switches, each of which forms when closed a direct connection between the line-circuit and a pair of said studs.

6. The combination in a surface-contact electric-railway system, of a row of high-potential studs or sectional conductors, a row of low-potential studs, switches comprising a magnet-coil between the low-potential studs and the line-circuit, electrical connections from each high-potential stud to two of the switches, and separate normally-insulated contacts at each switch connected to adjacent studs, whereby when the system is in operation each switch in closing connects a new stud to the line and establishes a new connection to a second stud already alive.

7. The combination in a surface-contact electric-railway system, of a series of studs or sectional conductors insulated from each other when electrically inactive, three-point switches which on closing connect the line conductor with a pair of adjacent studs through the several switch-contacts, and magnet-coils on the switches the circuit of which is completed by collector-shoes on the cars.

8. In a surface-contact electric-railway system, the combination of a row of high-potential studs forming one side of the motor-circuit, a second row of low-potential studs completing the circuit so that the two sets of studs and the motor are in series, line-switches, each having a magnet-coil coupled permanently, and independently of the magnet-winding of any other switch, in a separate branch connection between one of the low-potential studs and the line-circuit; whereby each switch may be energized independently of any other switch, and electrical connections between the switches and high-potential studs, such that one of the high-potential studs is always connected to line before the collector-shoe makes contact with it in either direction of travel of the car.

9. The combination in a surface-contact electric-railway system, of a row of high-potential studs or sectional conductors, switches, electrical connections between contacts at each switch and a pair of said studs such that when the system is in operation any given stud is connected to line, first through one switch and then through a second switch, and the two connections are then opened successively in the order in which they are made, a row of low-potential studs, and magnet-coils on the switches connected permanently between the low-potential studs and the negative side of the line-circuit.

10. The combination in an electric-railway system, with the three-point line-switches G, the high-potential studs or sectional conductors B each connected with contacts at a pair of switches and in pairs to each switch, the row of low-potential studs C staggered with reference to the high-potential studs, and magnet-coils on the switches permanently connected between the low-potential studs and the return-conductor forming part of the line-circuit, as set forth.

11. A controlling device for a surface-contact railway, comprising contacts and connections for regulating the motors from rest to full speed, and a contact or contacts shunting a part of the line-current through the electromagnetic switches during the time the motor-current is interrupted, thereby preserving the live circuit of the car.

12. A controlling device for a surface-contact railway provided with contacts for regulating the motors from rest to full speed, and a contact or contacts completing a shunt-circuit through a limiting-resistance and the automatic switches of the system, thus shunting a part of the line-current through the switches during the time the motor-current is interrupted and keeping alive the contact over which the car may be.

13. A controller for a surface-contact electric railway provided with contacts for regulating the motor from rest to full speed, a contact or contacts connected to energize at least one of the automatic electromagnetic switches of the system during the time that the motor-current is interrupted and thus keep alive the contact or contacts over which the car may be, thereby preserving the lighting system and the capacity for starting the motors.

14. In a surface-contact railway system, a magneto-generator connected between the sliding contacts of the car, actuated by a stud, and a rack and pinion so arranged that the foot of the motorman may rotate the magneto-generator to pick up the switch-contacts at starting.

In witness whereof I have hereunto set my hand this 3d day of October, 1896.

WILLIAM B. POTTER.

Witnesses:
B. B. HULL,
E. W. CADY.